United States Patent [19]

Girgis et al.

[11] Patent Number: 5,188,277
[45] Date of Patent: Feb. 23, 1993

[54] METHOD OF JOINING TRANSFORMER COIL CONDUCTORS

[75] Inventors: Ramsis S. Girgis, Muncie, Ind.; Paul W. Martincic, Hermitage, Pa.

[73] Assignee: Electric Power Research Institute, Inc., Palo Alto, Calif.

[21] Appl. No.: 851,214

[22] Filed: Mar. 13, 1992

Related U.S. Application Data

[63] Continuation-in-part of Ser. No. 633,938, Dec. 26, 1990, Pat. No. 5,104,028, which is a continuation-in-part of Ser. No. 458,516, Dec. 28, 1989, abandoned.

[51] Int. Cl.⁵ .................. B23K 20/10; H01L 21/607
[52] U.S. Cl. .................... 228/111; 228/171; 228/179
[58] Field of Search .............. 228/110, 111, 170, 171, 228/265, 179, 1.1

[56] References Cited

U.S. PATENT DOCUMENTS

| | | |
|---|---|---|
| 411,637 | 9/1889 | Batchelor et al. |
| 2,946,119 | 6/1960 | Jones et al. |
| 3,029,666 | 4/1962 | Lovins |
| 3,336,657 | 9/1964 | Flaming |
| 3,634,649 | 1/1972 | Rager et al. |
| 3,791,569 | 2/1974 | Mims |
| 3,917,146 | 11/1975 | Culp |
| 3,952,937 | 4/1976 | Lamons et al. |
| 4,032,382 | 6/1977 | Obeda |
| 4,047,657 | 9/1977 | Mims |
| 4,088,257 | 5/1978 | Devine |
| 4,219,249 | 8/1980 | Teytaud |
| 4,294,392 | 10/1981 | Colloff |
| 4,401,252 | 8/1983 | Hamano et al. |
| 4,646,957 | 3/1987 | Nuss |
| 4,852,788 | 8/1989 | Patrikios |
| 4,867,370 | 9/1989 | Welter et al. |
| 5,104,028 | 4/1992 | Martincic et al. ............... 228/111 |

FOREIGN PATENT DOCUMENTS

| | | |
|---|---|---|
| 028264 | 5/1981 | European Pat. Off. |
| 133883 | 6/1984 | European Pat. Off. |
| 149737 | 7/1981 | Fed. Rep. of Germany |
| 3437749 | 4/1986 | Fed. Rep. of Germany |
| 14379 | 7/1964 | Japan |
| 4224980 | 11/1967 | Japan |
| 54-34678 | 3/1979 | Japan ..................... 228/111 |
| 317249 | 12/1988 | Japan |
| 83388 | 3/1989 | Japan |
| 302925 | 9/1981 | U.S.S.R. |
| 1222471 | 7/1986 | U.S.S.R. |

OTHER PUBLICATIONS

Hafatrom, J. W.; "Joining NbTi Superconductors by Ultrasonic Welding," IEEE Transactions on Mangetics, vol. MAG-13, No. Jan.

Witherell, Charles E.; "Diffusion Welding Multifilament Superconductive Composites," Welding Research, Jun. 1978.

Devine, Janet; "Ultrasonic Welding," Metals Handbook Ninth Edition, vol. 6, Copyright 1983, pp. 746–756.

European Patent Office abstract No. 90-089850 of Soviet Union 1,507,553 Sept. 15, 1989

*Primary Examiner*—Samuel M. Heinrich
*Attorney, Agent, or Firm*—Flehr, Hohbach, Test, Albritton & Herbert

[57] ABSTRACT

A method of joining transformer winding conductor cables is disclosed. Initially, the ends of the conductor cables to be joined are cut in a staggered configuration. The staggered ends are then chamfered. The ends are then welded together to form a staggered joint which is of substantially the same thickness as the individual conductor cables.

13 Claims, 8 Drawing Sheets

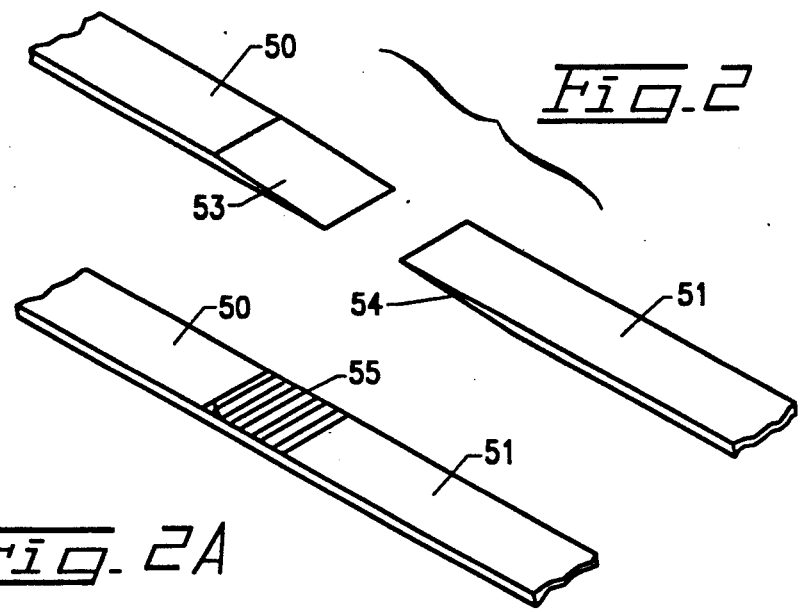
Fig. 2
Fig. 2A
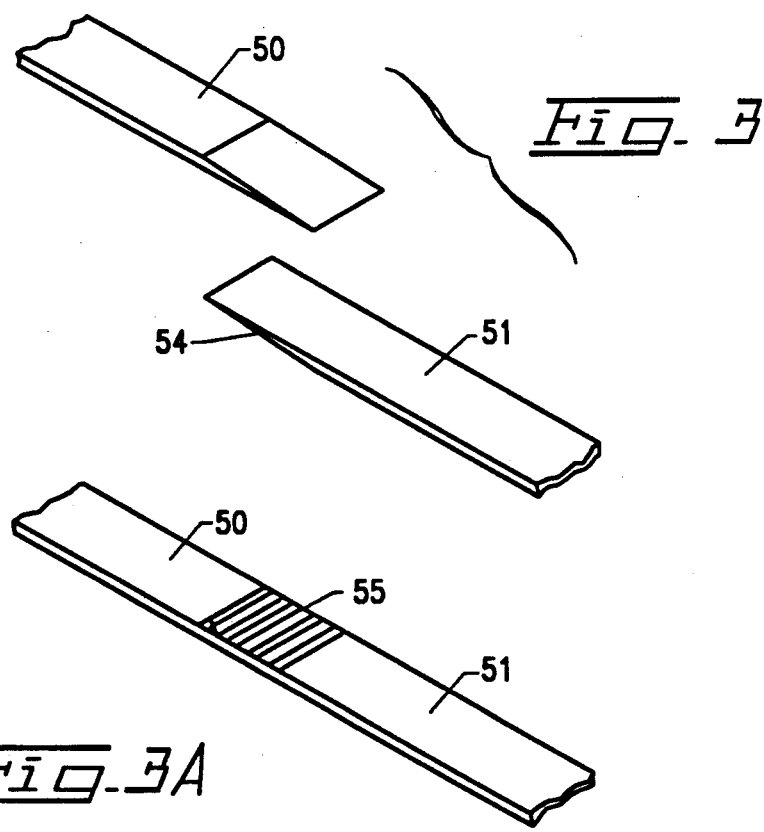
Fig. 3
Fig. 3A

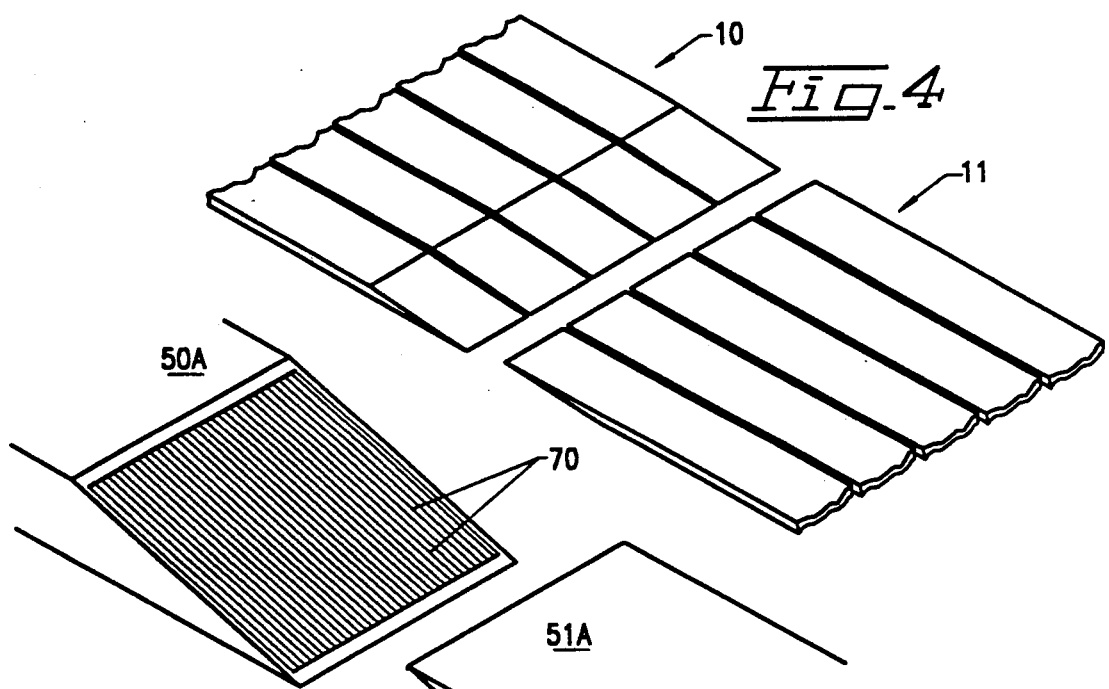
Fig. 4
Fig. 5
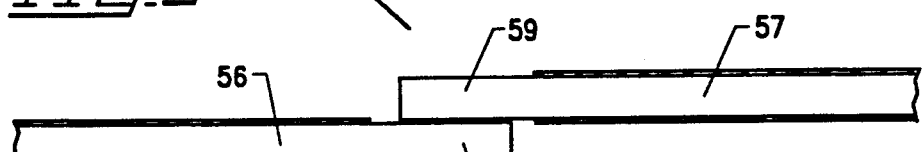
Fig. 6
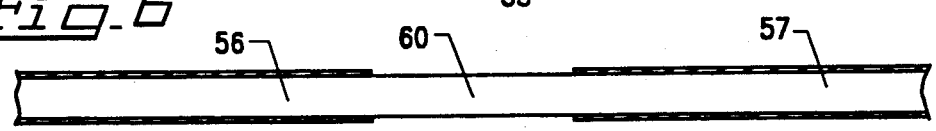
Fig. 7
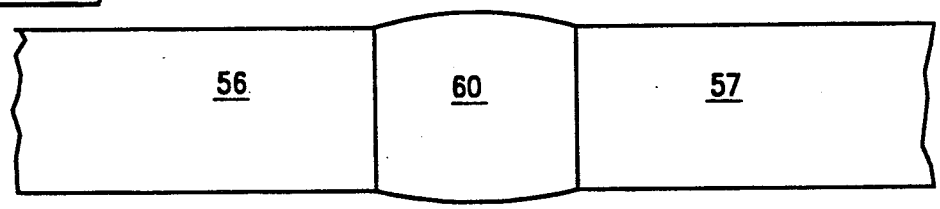
Fig. 8
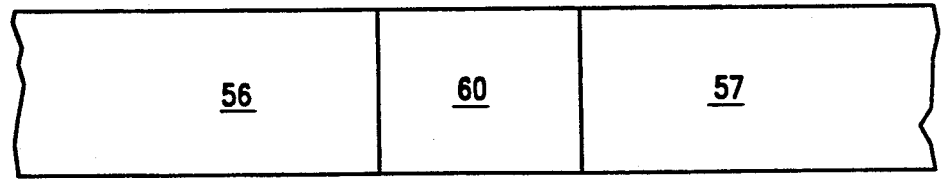
Fig. 9

METHOD OF JOINING TRANSFORMER COIL CONDUCTORS

This application is a continuation-in-part of application Ser. No. 07/633,938 filed on Dec. 26, 1990, now U.S. Pat. No. 5,104,028, which is a continuation-in-part of Ser. No. 07/458,516 filed on Dec. 28, 1989, now abandoned.

BRIEF DESCRIPTION OF THE INVENTION

This invention relates generally to an improved method of fabricating transformer windings. More particularly, the present invention relates to a method of joining conductors which form transformer windings.

BACKGROUND OF THE INVENTION

Modern transformer windings are fabricated using a wide variety of methods. In high power applications, one or more substantially rectangular shaped conductors are spirally wound about a core to form a coil. Often, the conductive cable itself is composed of a plurality of cable elements, with each cable element comprising a plurality of strands arranged side by side in a row.

The conductors used for transformer windings are typically fabricated in standard lengths. Therefore, for larger transformers, it is frequently necessary to serially join two or more conductor cables. Additionally, recent research has indicated that more efficient transformers can be produced by winding different portions of certain transformers with conductor strands having different strand configurations. For example, as described in U.S. Pat. No. 4,864,266, it may be desirable to wind the tap and end sections of a core form transformer with conductor strands formed differently than those used in the body section. In such circumstances, the two types of cables must be joined as well.

Two of the methods most commonly used to join conductor cables are brazing and crimping. While these two methods have proven to be reliable conductor joining solutions, they each have several drawbacks as well. In brazing, the end of one cable is overlapped with the beginning of the next cable and the joint is then brazed. Thus, the resultant joint is usually about twice the conductor thickness. Additionally, overlap brazing requires the thorough cleaning of all of the conductor insulation, which is somewhat difficult for multi-strand conductor cables. Insulation cleaning requires the use of a skilled operator, and the brazing operation itself introduces contaminants to the coil winding and heats both coil conductor and insulation.

Crimping typically uses a separate connecting piece that is crimped to the ends of the joined conductors. Like overlapping joints, crimped joints are also larger than the conductors themselves in either thickness or width. The connecting pieces required to form non-overlapping joints are undesirable because they require additional cost and are inconvenient. Since the size of the crimp connector will differ for different conductors, additional parts are required to accommodate different conductors. Crimp joints also require the removal of the conductor insulation prior to crimping.

One recently developed method of joining metals together uses an "ultrasonic" or "vibratory" cold welding process. To bond the metals together, high frequency mechanical energy is applied to the joint while pressure is applied to push the two parts being cold welded together. The vibratory energy causes one workpiece to undergo relative translating motion with respect to the other and induces a molecular interchange that can form a very strong bond when the vibrations are ended. Representative vibratory welding apparatus are described in U.S. Pat. Nos. 3,029,666; 3,791,569; 3,917,146; and 4,088,257. As described in U.S. Pat. No. 4,047,657, in many instances, insulation, an oxide film, paint, or other contaminants are present on the workpiece prior to the cold welding operation. It is therefore frequently necessary to clean the workpiece surfaces to be joined prior to inducing the molecular bonds. One cleaning approach is to divide the vibratory actions into two stages of operation. In the first stage, a rubbing action is provided to clean the surfaces of the workpieces to be joined. In the second stage, the molecular interchange is induced. Typically, the vibrational frequencies and amplitudes used for the two stages would be different. Such an approach works well when only thin layers of contaminants are found and the weld does not have to be continuous. However, when thick surface contaminations such as enamel coating are present on the workpiece surface, the contaminants tend to interfere with the quality of the welds.

Ultrasonic welding techniques have been used in numerous applications. For example, U.S. Pat. No. 4,401,252 discloses a method of connecting a starter motor armature coil to a commutator. U.S. Pat. No. 4,712,723 describes a method for bonding an insulated wire to a contact element. Specifically, during the ultrasonic welding operation, the wire's insulation layer is destroyed by mechanical action and the metallic parts are bonded by friction welding and concurrent deformation. However, the deformed area is susceptible to shearing. Accordingly, the '723 patent contemplates applying a suitable adhesive to the bond area to protect its mechanical connection. While such processes are apparently suitable for their intended tasks, they cannot be readily extended to the joining of transformer winding conductor cables which require a bond nearly as strong as the conductor cables themselves and preferably, the formation of a joint which is substantially the same cross section as the cables being joined.

OBJECTS AND SUMMARY OF THE INVENTION

It is a general object of this invention to provide a method of joining elongated conductor cables.

It is a more particular object of this invention to provide a method of joining elongated conductor cables with a staggered joint.

It is another object of this invention to provide a staggered joint between joined conductor cables which is substantially the same cross sectional area as the cables themselves.

It is yet another object of this invention to provide a method of joining transformer conductor cables using a vibratory welding process.

To achieve the foregoing and other objects of this invention, a method of joining transformer winding conductor cables is disclosed. Initially, the ends of the conductor cables to be joined are cut in a staggered configuration. The staggered ends are then chamfered. The ends are then welded together to form a staggered joint which is of substantially the same thickness as the individual conductor cables.

BRIEF DESCRIPTION OF THE DRAWINGS

The features of this invention that are believed to be novel are set forth with particularity in the appended claims. The invention, together with further objects and advantages thereof, may best be understood by reference to the following description taken in conjunction with the accompanying drawings in which:

FIG. 2 is a diagrammatic perspective view of chamfered conductor element ends prior to welding the ends along their inclined sides.

FIG. 2A is a diagrammatic perspective view of the conductor elements shown in FIG. 2 welded together.

FIG. 3 is a diagrammatic perspective view of chamfered conductor element ends prior to welding the ends along their flat sides.

FIG. 3A is a diagrammatic perspective view of the conductors shown in FIG. 3 welded together.

FIG. 4 is a diagrammatic perspective view of two conductors including multiple conductor elements with inclined ends which are to be welded together in a straight joint.

FIG. 5 is a diagrammatic perspective view of a plurality of strands of a cable element.

FIG. 6 is a diagrammatic side view of a pair of overlapped non-chamfered conductors prior to cold welding.

FIG. 7 is a diagrammatic side view of the conductors shown in FIG. 6 after the welding operation.

FIG. 8 is a diagrammatic top view of the welded conductor cables shown in FIG. 7.

FIG. 9 is a diagrammatic top view of the welded conductor cables shown in FIG. 8 after the trimming operation.

DETAILED DESCRIPTION OF THE DRAWINGS

Figure 1:
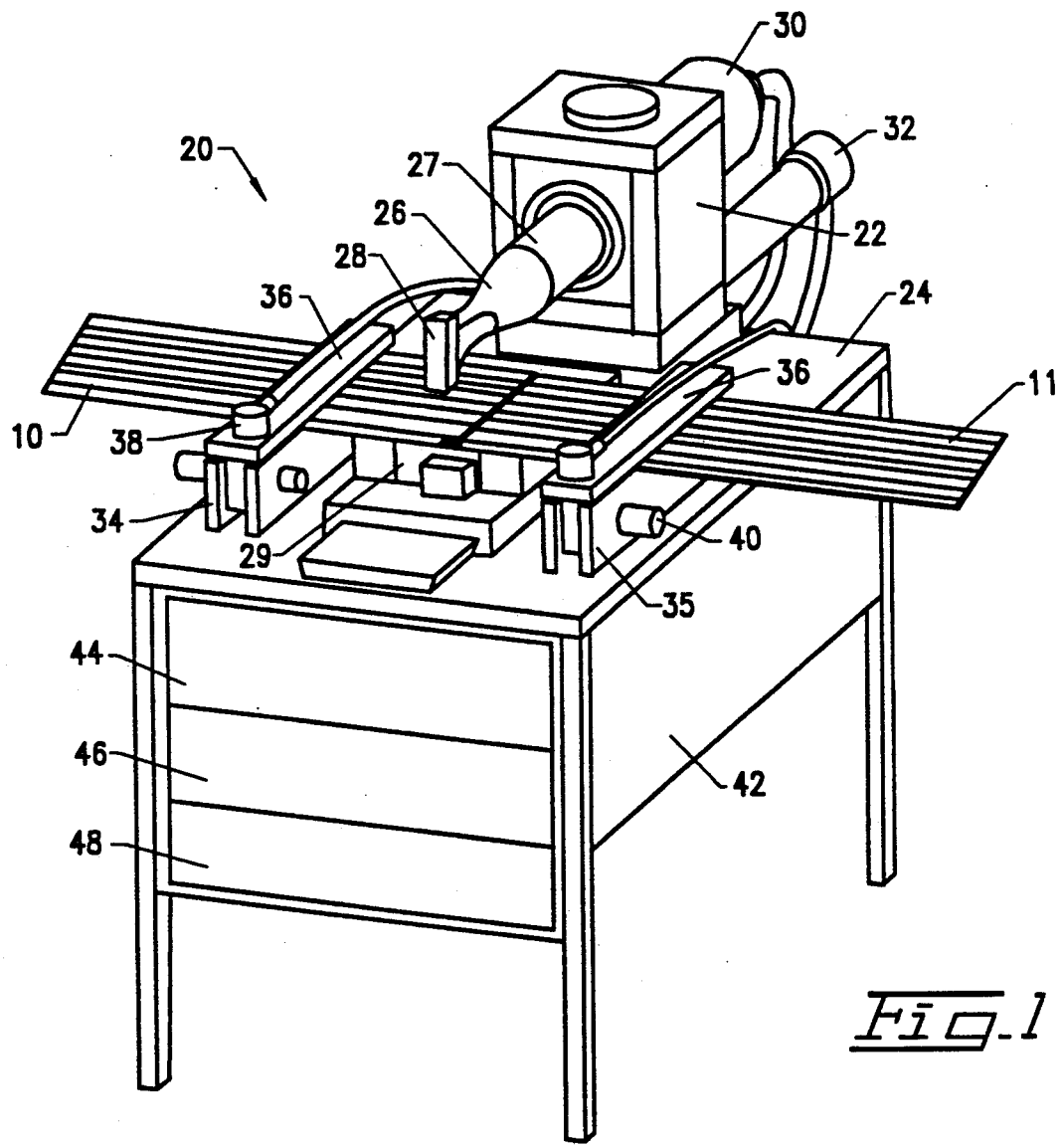
FIG. 1 is a diagrammatic perspective view of a vibratory welding system suitable for joining two elongated conductors in accordance with the present invention.

As illustrated in the drawings, a method is disclosed for welding conductors together. Referring to FIG. 1, an ultrasonic welding apparatus 20 is described that is suitable for carrying out the welding operations described below. While ultrasonic welding of the conductors is the preferred embodiment, a brazing operation may also be employed when joining the staggered conductors, as will be more fully described below.

The welding apparatus 20 includes a housing 22 mounted to a welding table 24. The housing 22 carries a pneumatically driven horn 26 having an arm 27 that carries an anvil head 28 at its distal tip. The anvil head 28 is positioned over an anvil plate 29 that is fixably mounted to the table 24. A pneumatic cylinder 30 controls the horizontal movement of the arm and vibrates the arm 27 at a very high frequency such that the head 28 vibrates within a horizontal plane.

In operation, the workpieces 10 and 11 to be joined are positioned on the table beneath the anvil head 28 within a strike zone that is defined as the region where the anvil head 28 would contact the anvil plate 29. The workpieces are positioned such that their ends are overlapped within the strike zone. Once the workpieces are properly positioned they are secured in place by support clamps 34. The arm 27 is then lowered until the head 28 contacts the upper workpiece.

During welding, the pneumatic cylinder 30 causes the arm to both vibrate and apply pressure to the joint region during vibration. In practice, vibrational frequencies in the neighborhood of 20 kHz work well under the influence of a static pressure on the order of 1300 psi. By way of example, a suitable ultrasonic welding apparatus is a 3½ kilowatt lateral drive type ultrasonic welding machine.

The conductor support clamps 34 are slidably mounted to the table 24 on opposite sides of the anvil plate 29. Each support clamp 34 includes a pivotal clamp arm 36, pivotally connected to the clamp base 35 to facilitate opening the clamp to receive a conductor cable to be welded. Since in numerous applications the conductor cables 10, 11 to be joined will be wider than the anvil head 28, the clamps 34 are slidable along a single axis that is parallel to the table. A pneumatic cylinder 32 secured to housing 22 controls the horizontal movements of the clamps. This allows the entire joint region of the conductors to be joined to be passed back and forth through the contact zone to provide a complete weld.

To weld a particular joint, the clamp arms 36 are lifted and the conductor cables 10, 11 to be joined are placed on the clamps such that their respective ends overlap within the contact zone. The clamp arms are then lowered and locked to the base 35 to firmly hold the conductor cables in places. Pneumatic cylinder 30 is then activated to lower the anvil head 28 into contact with the joint and then vibrates the anvil head 28 at the desired frequency to complete the cold weld. When the conductor cables 10 and 11 are wider than the width of anvil head 28, the support clamps are slid back and forth relative to the table top 24 to allow the entire joint to pass through the contact zone.

The table 24 has a cabinet 42 which houses the pneumatic and electrical components necessary to drive the horn 26. The cabinet can also house any required quality control electronics.

Referring next to FIG. 2, in the first described method of welding transformer conductor cables together, the ends 53, 54 of conductor cable elements 50, 51 to be joined are first chamfered in a complementary manner. The chamfered ends are obtained using a conventional scarfing process. It should be appreciated that any insulation on the conductor cable such as enamel or paper, will be removed from the chamfered surface by the scarfing operation. The complementary conductor cable ends 53 and 54 are then mated in the contact zone beneath the anvil head 28 and the welding process is initiated. It should be appreciated that since the chamfered ends are overlapped, the resultant joint is substantially the same width and thickness as the cable elements 50 and 51 respectively. This feature is depicted in FIG. 2A.

To insure good joint strength, the duration, frequency and amplitude of the vibrations used in the welding process are preferably arranged to provide a weld having a tensile strength that is at least approximately 80% of the tensile strength of the cable strands used.

FIG. 3 depicts a particularly successful embodiment of the present invention. In this embodiment, the chamfered ends, or inclined ends, are joined in a noncomplementary manner. That is, the inclined ends are facing outward, opposite to one another, while the flat sides are welded together. The resultant joint is depicted in FIG. 3A.

Referring next to FIGS. 4 and 5, it should be apparent that the described chamfering process can also be used to couple conductors having multiple conductor cable elements as seen in FIGS. 1 and 4. In such an embodiment, the ends of each of the cable or conductor elements in conductor cables 10 and 11 are chamfered. Since conductor cables having several conductor elements will typically be wider than the anvil head 28, the conductors will be moved through the contact zone by clamps 34 as described above.

Conductor elements 50(a) and 51(a) having multiple insulated strands 70, as shown in FIG. 5, can be readily joined using the same process. The multi-stranded conductor elements may be arranged to provide substantially strand for strand mating between the various conductor strands of the conductor elements being joined. It should be apparent that the chamfered ends of the conductor elements allow welding without requiring the conductive materials to flow a great deal during the welding process. Therefore, the enamel strand insulation common on multi-strand conductor elements will not substantially interfere with the welding process.

Referring next to FIGS. 6–9, an alternative vibratory welding process will be described. In the second described process, the conductor ends are first bared using conventional stripping techniques. The bared elements are then overlapped and placed within the contact zone beneath the anvil head 28 of welding apparatus 20. The pneumatics driving the anvil head 28 are then arranged to apply sufficient pressure during the welding operation to flatten the overlapped area to the width of a single conductor element. It will be appreciated that with such an arrangement, a substantial amount (approximately half) of the overlapped material will need to flow from the joint region. As seen in FIG. 8, in one embodiment a substantial percentage of these materials flow to the outside of the combined cables (while some portion will go to elongation of the combined cable if the clamps 36 are loose enough to allow some axial movement of the conductor). The excess material can then be ground away from the sides of the joint using traditional grinding techniques. The sides are ground to form a joint 60 having the same cross sectional area as the conductor elements 56, 57 as seen in FIG. 9.

Alternatively, the cables may be placed within a trough during the vibratory welding step. The trough causes all the excess joint materials to cold flow in a longitudinal direction which results in an elongation of the conductor as opposed to excess material. With such arrangement there is no need to trim excess materials away from the sides of the conductor.

Figure 10:
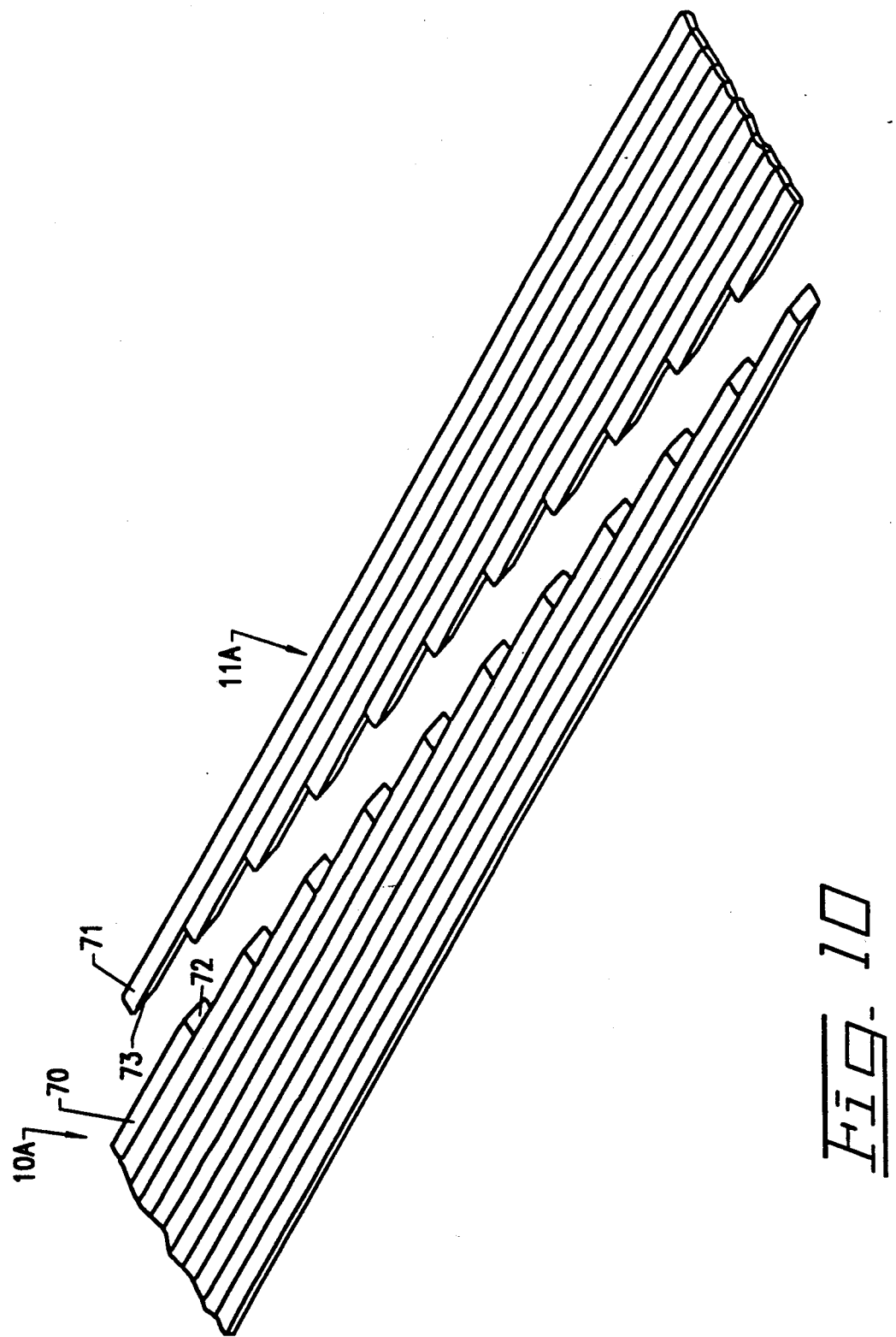
FIG. 10 is a diagrammatic perspective view of two conductors including multiple conductor elements which have correspondingly staggered and chamfered ends.

FIG. 10 depicts another embodiment of the present invention wherein two conductor cables 10A and 11A are aligned in a staggered configuration. In particular, individual conductor elements 70 of conductor 10A are set in a staggered arrangement with individual conductor elements 71 of conductor 11A. Preferably, the ends 72 and 73 are chamfered, as previously described.

Figure 11:
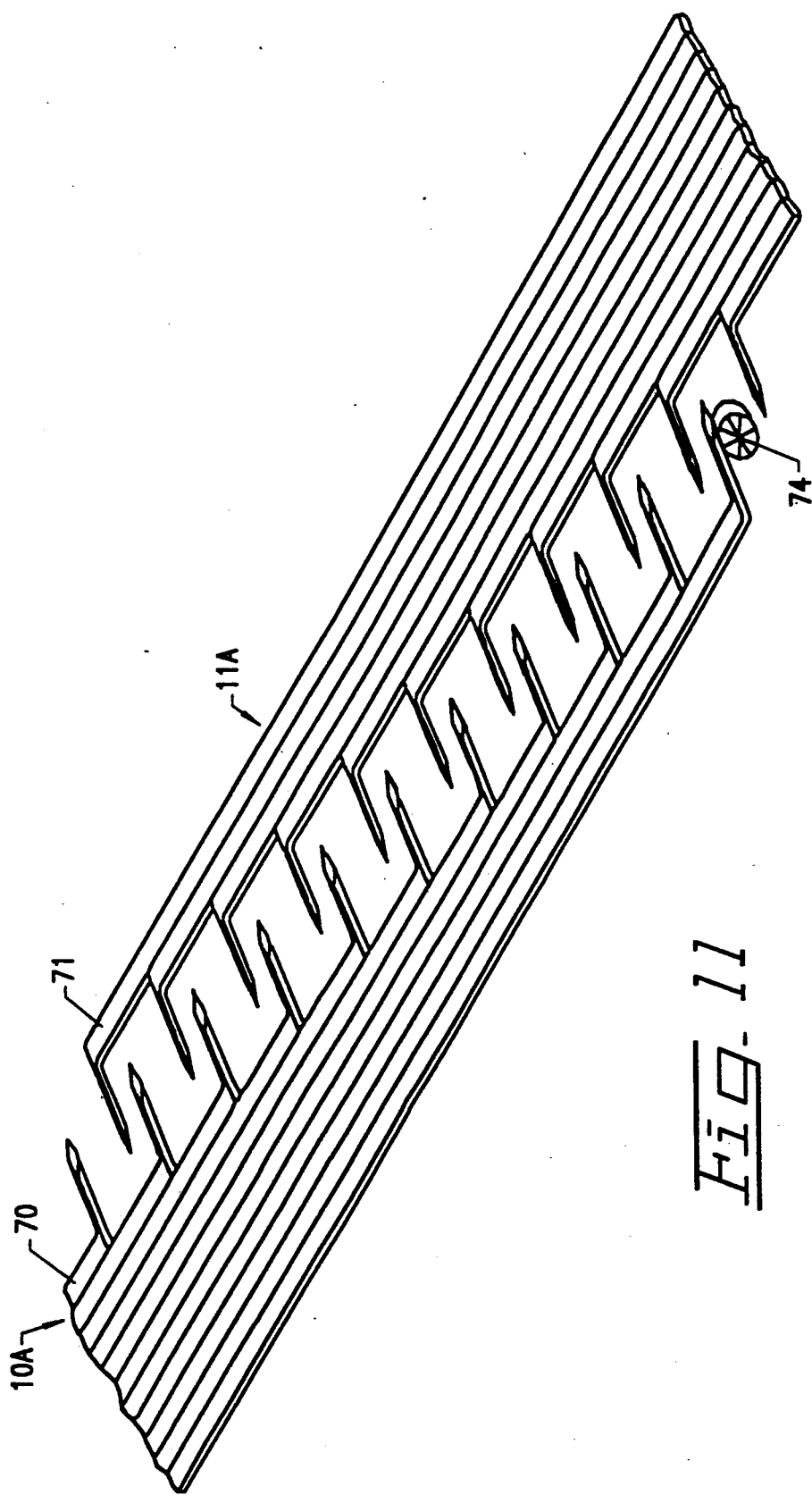
FIG. 11 is a diagrammatic perspective view of the conductors of FIG. 10 with the ends of the conductor elements in the process of being cleaned.

Turning to FIG. 11, the conductor or cable elements 70 and 71 are preferably bent to facilitate removal of insulation. A stainless wire brush 74 may be used in a conventional manner to clean insulation from the cable elements 70 and 71.

Figure 12:
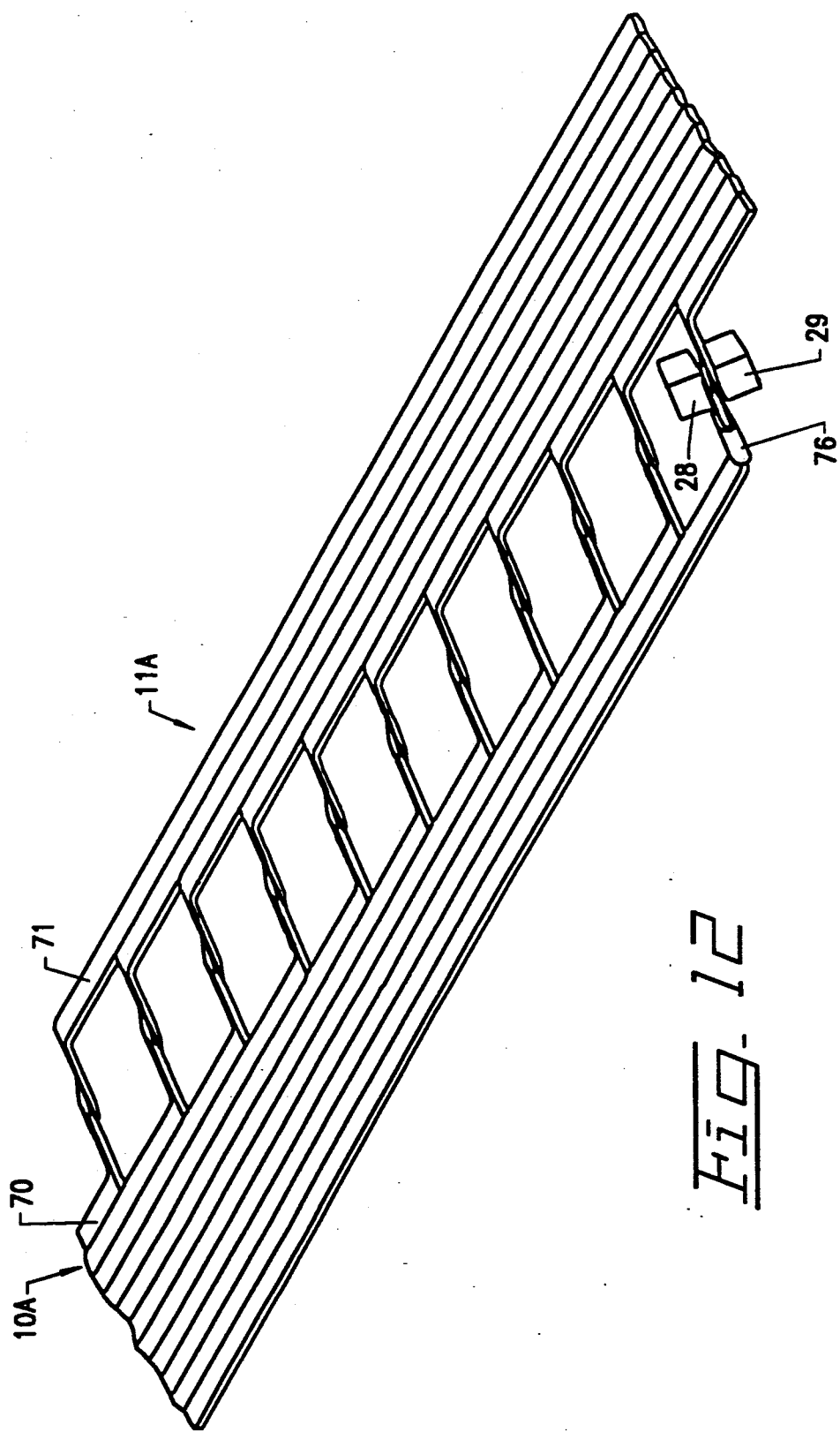
FIG. 12 is a diagrammatic perspective view of the conductors of FIG. 11 with the cleaned ends overlapped and in the process of being sequentially welded.

As depicted in FIG. 12, the conductor elements 70 and 71 are then overlapped and joined by the cold welding process previously described. In particular, each set of overlapped conductor elements 70 and 71 are placed in contact with one another and then positioned between anvil head 28 and anvil plate 29 for cold welding. In an alternate embodiment, the staggered and overlapped conductor elements 70 and 71 are brazed together. In the brazing embodiment, the staggered configuration prevents the formation of a large horizontal joint. In the cold welding embodiment, the cold welding prevents the formation of an oversized joint altogether since the resultant joint is largely the same cross-sectional area of the individual elements. The staggered configuration is useful in the cold welding embodiment since it enables a thorough cleaning of the cable elements and avoids a localized joint region.

Figure 13:
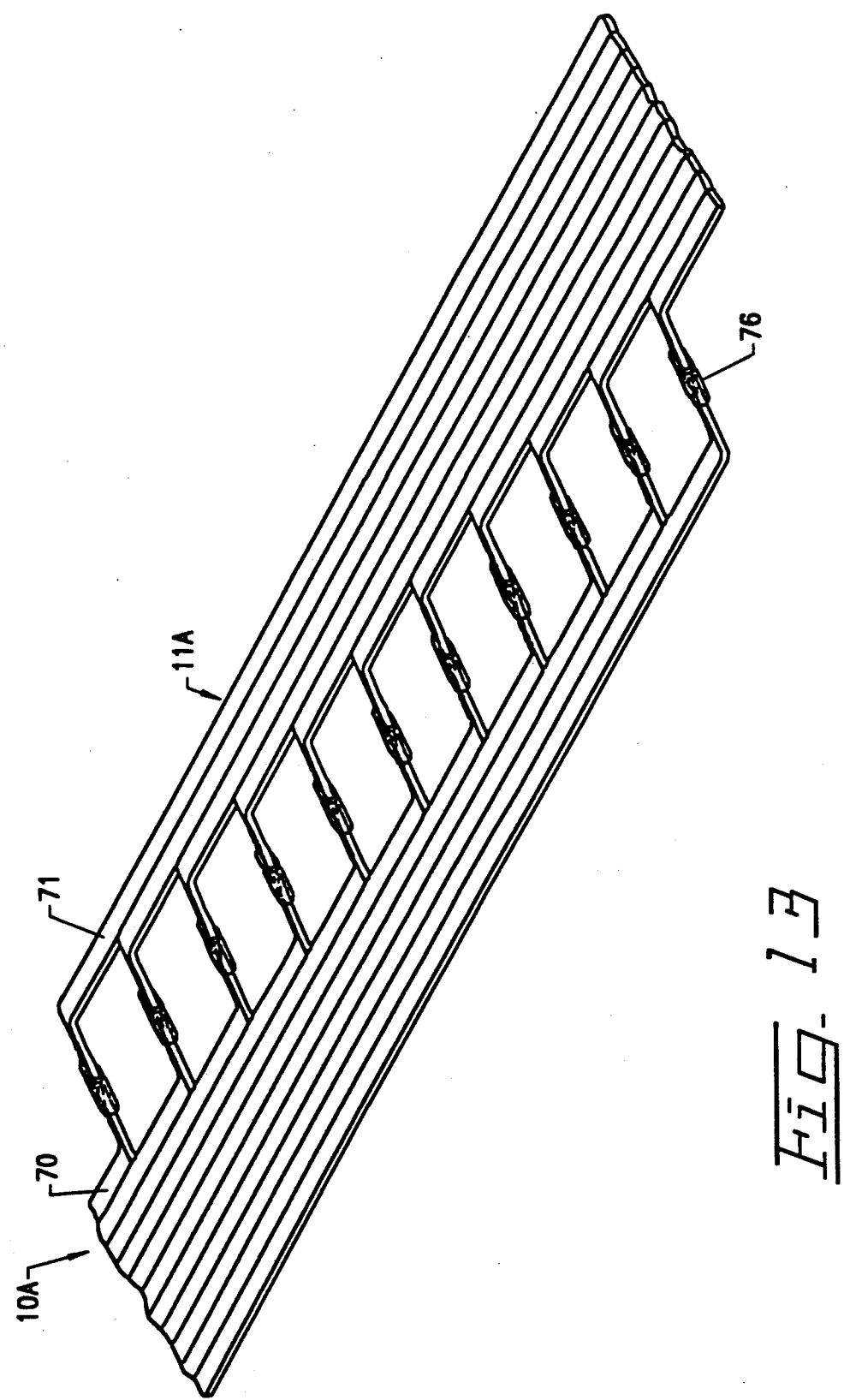
FIG. 13 is a diagrammatic perspective view of the conductors of FIG. 12 being reinsulated after welding.

Turning now to FIG. 13, after the welding operation, the welded joint is reinsulated. This may be accomplished be placing a sleeve 76 of insulation over the welded joint. As depicted in FIG. 12, the sleeve 76 may be placed on a conductor element 70 prior to the welding or brazing operation. The sleeve 76 may be a shrink-fit insulator.

Figure 14:
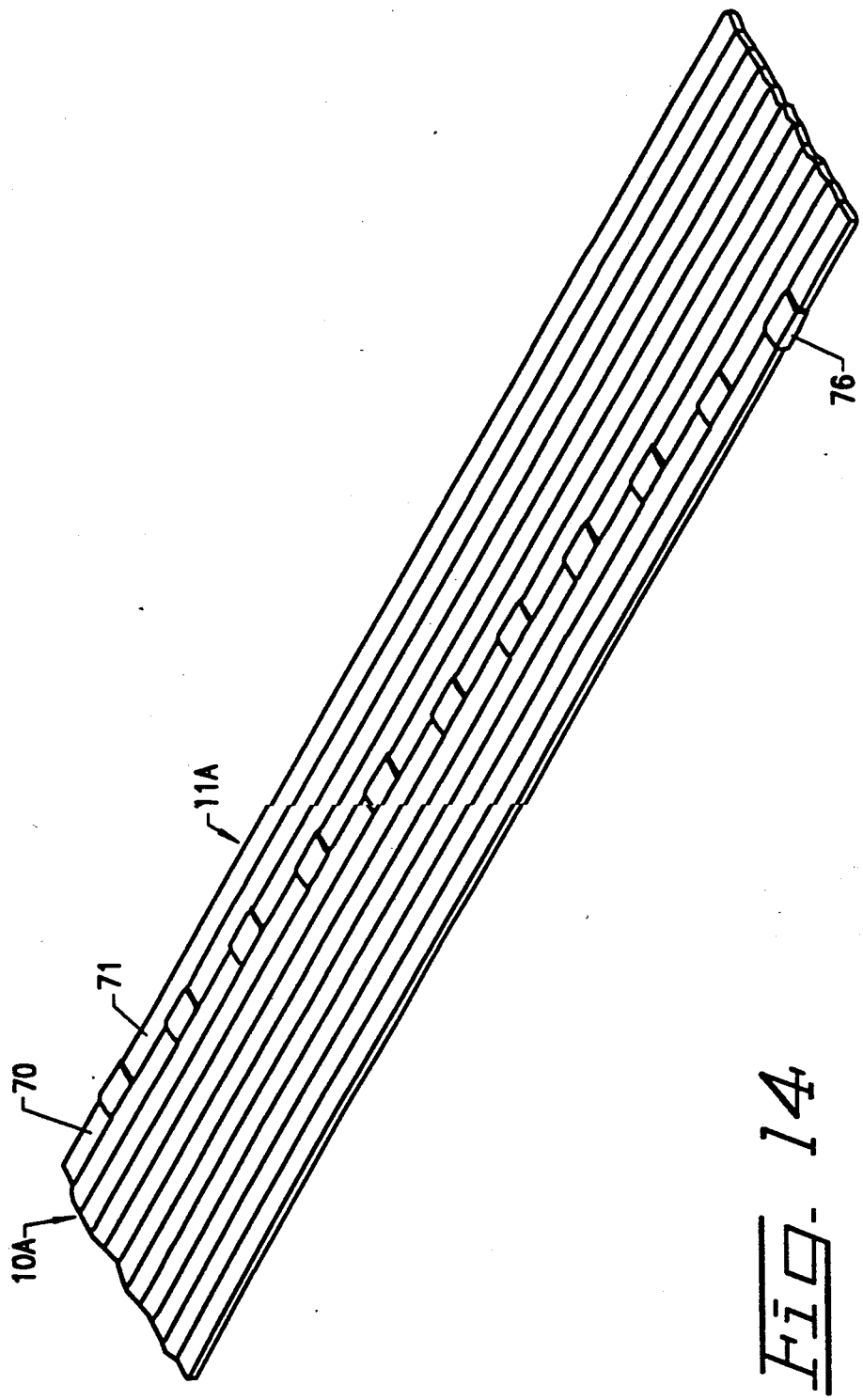
FIG. 14 is a diagrammatic perspective view of the conductors of FIG. 13 after straightening.

After reinsulating the joint, the conductor cables 10A and 11A are completed, as depicted in FIG. 14. Of course, if the cleaning step included bending the conductor elements 70 and 71, then the conductor elements must be straightened.

Although only a few embodiments of the present invention have been described herein, it should be understood that this invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

We claim:

1. A method of joining conductors comprising the steps of:
    staggering the ends of cable elements of a first insulated rectangular cable and the ends of cable elements of a second insulated rectangular cable, said staggering step including the steps of:
        staggering said ends of said cable elements of said first insulated rectangular cable along the longitudinal axis of said first insulated rectangular cable, and
        staggering said ends of said cable elements of said second insulated rectangular cable along the longitudinal axis of said second insulated rectangular cable;
    aligning said ends of said cable elements of said first insulated rectangular cable with said ends of said cable elements of said second insulated rectangular cable; and
    joining said cable element ends of said first insulated rectangular cable with said cable element ends of said second insulated rectangular cable to form a staggered joint of substantially the same cross-sectional area as said cable elements of said first and said second insulated rectangular cables.

2. The method of claim 1 further comprising the steps of:
chamfering said ends of said first and said second cable elements of said first and said second insulated rectangular cables;
cleaning said ends of said first and said second cable elements of said first and said second insulated rectangular cables prior to said joining step; and
reinsulating said staggered joint after said joining step.

3. A method of joining conductors comprising the steps of:
staggering the ends of conductor elements of a first conductor and the ends of conductor elements of a second conductor;
chamfering said ends of said first and said second conductor elements;
bending said ends of conductor elements of said first conductor and said ends of conductor elements of said second conductor;
cleaning said ends of said conductor elements of said first conductor and said ends of said conductor elements of said second conductor;
aligning said ends of said conductor elements of said first conductor with said ends of said conductor elements of said second conductor;
joining said conductor element ends of said first conductor with said conductor element ends of said second conductor to form a staggered joint of substantially the same cross-sectional area of said conductor elements;
reinsulating said staggered joint; and
straightening said first and said second conductor elements after said reinsulating step.

4. The method of claim 3 wherein said joining step includes the steps of:
overlapping said staggered conductor element ends of said first conductor with said staggered conductor element ends of said second conductor; and
welding said overlapping conductor element ends with vibratory energy.

5. A method of joining conductor cables for transformer windings comprising the steps of:
staggering the ends of cable elements of a first insulated rectangular cable and the ends of cable elements of a second insulated rectangular cable;
chamfering the ends of said cable elements of said first insulated rectangular cable and said ends of said cable elements of said second insulated rectangular cable;
overlapping said chamfered ends of said first and said second cable elements to form overlapping staggered cable ends; and
joining said overlapping staggered cable ends by pressing said overlapping staggered cable ends together and applying vibratory energy to at least one of said cable ends to form a staggered joint which is not substantially thicker than the thickness of said first cable.

6. The method of claim 5 wherein said first and said second insulated rectangular cable elements have a multiplicity of strands.

7. The method of claim 6 wherein said chamfering step is accomplished by scarfing said cable element ends, said scarfing also removing the insulation from the portions of said cables to be joined.

8. The method of claim 7 wherein said overlapping step is accomplished by placing said chamfered ends in a noncomplementary relationship.

9. The method of claim 5 further comprising the steps of:
cleaning said ends of said first and said second cable elements prior to said overlapping step; and
reinsulating said staggered joint after said joining step.

10. The method of claim 9 further comprising the steps of:
bending said ends of said first and said second cable elements prior to said cleaning step; and
straightening said first and said second cable elements after said reinsulating step.

11. A method of joining conductors for transformer windings comprising the steps of:
staggering the ends of cable elements of a first insulated rectangular multi-strand conductor and the ends of cable elements of a second multi-strand insulated rectangular conductor;
chamfering the ends of said cable elements of said first conductor and said ends of said cable elements of said second conductor;
cleaning said ends of said first and said second cable elements;
overlapping said chamfered and cleaned ends of said first and said second cable elements to form overlapping staggered conductor ends;
joining said overlapping staggered conductor ends by pressing said overlapping staggered conductor ends together and applying vibratory energy to at least one of said conductor ends to form a staggered joint which is not substantially thicker than the thickness of said first conductor; and
reinsulating said staggered joint after said joining step.

12. The method of claim 11 further comprising the steps of:
bending said ends of said first and said second cable elements prior to said cleaning step; and
straightening said first and said second cable elements after said reinsulating step.

13. The method of claim 12 wherein said overlapping step is accomplished by placing said chamfered ends in a noncomplementary relationship.

* * * * *